Dec. 26, 1939.   H. WOODRUFF   2,184,968
WEEDER
Filed Feb. 25, 1937
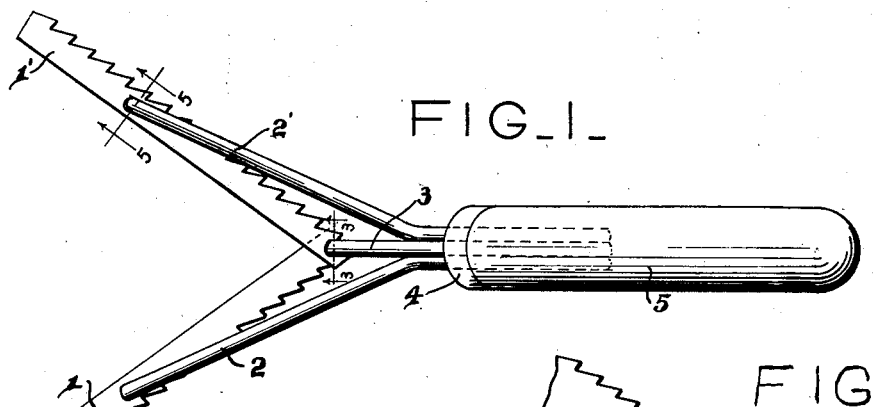
FIG_1_
FIG_6_
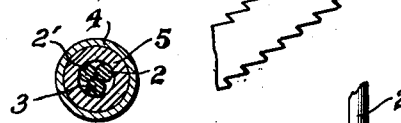
FIG_4_
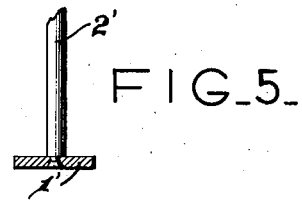
FIG_5_
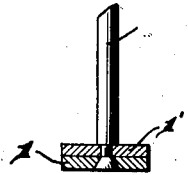
FIG_3_
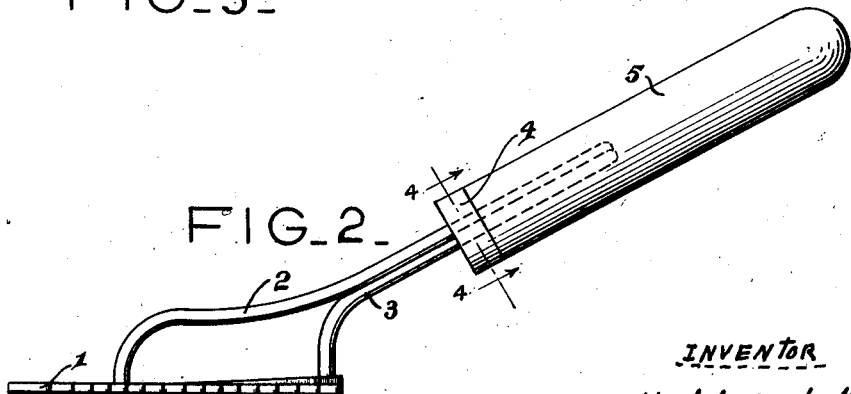
FIG_2_
INVENTOR
Herbert Woodruff Patented Dec. 26, 1939

2,184,968

UNITED STATES PATENT OFFICE 2,184,968

WEEDER

Herbert Woodruff, Cherry Lane, N. C.

Application February 25, 1937, Serial No. 127,597

1 Claim. (Cl. 97—63)

My invention relates to a superior type of weeder in which serrated steel blade or blades with forwardly directed teeth of ripsaw sharpness spread at a most effective angle are firmly supported and attached to a handle, and the objects of my invention are, first, to provide a weeder which is more effective than the usual type; second, to provide a tool of superior merit for thinning plants; third, to provide a weeder which can be readily sharpened with a file and thus retain its initial effectiveness; fourth, to provide a weeder which may be made in different sizes, may be used in garden, field or lawn; fifth, to provide a tool of novel and attractive design combined with such simple construction as to permit an economical cost of manufacture.

I attain these objects by means of a novel, practical and simply made device one form of which is illustrated in the accompanying drawing which forms part of this specification. The drawing pictures the short handled type of my weeder, in which—

Figure 1 is a top view of an entirely assembled weeder; Fig. 2, a side view of said weeder in position for use; Fig. 3, a detail in section on line 3—3 in Fig. 1; Fig. 4, a detail in section on line 4—4 in Fig. 2; Fig. 5, a detail in section on line 5—5 in Fig. 1, and Fig. 6, a fragmentary view of a one-piece V-shaped blade showing all edges serrated.

Similar numerals refer to similar parts in all the figures.

Figures 1 and 2 picture an entirely assembled, short handled, hand weeder with two blades having one edge serrated, and well illustrate its novel design and simple structure. It comprises a handle 5 which firmly holds the suports 2, 2' and 3 for the blades 1 and 1' and is reinforced by the ferrule 4. Fig. 3, a detail in section on line 3—3, Fig. 1, shows the connection between blades and central support. This connection applies to the use of two separate blades in weeder construction, referred to hereinafter. Fig. 4, a detail in section on line 4—4, Fig. 2, shows arrangement of supports and wooden handle within ferrule. This feature is not claimed essentially as my invention. Fig. 5, a detail in section on line 5—5, Fig. 1 shows connection between one of the blades and adjacent side support. This connection may be used for joining central support to vertex of blade when V-shaped, one-piece blade is used instead of two blades—optional with the manufacturer—joined to form vertex. Fig. 6 pictures a fragmentary view of a one-pieced V-shaped blade, showing all edges serrated.

In Figure 1 is shown the relative angle of blade or blades, the relative narrowness of blade, the free extension of blade ends beyond support joints and the rip-saw style of blade serration. Fig. 1 also makes plain the support arrangement which combined with narrow blade permits good clearance allowing free movement of dirt and trash over blade and thus prevents clogging. It also allows an unobstructed view when working close up to a plant, in removing weeds from among close plants or in thinning plants. These are important features of my invention and contribute much to its efficiency and versatility.

The weeder may be made in different sizes with equal effectiveness as a tool. The relative angle of the blade or blades, if found expedient, may be varied in the manufacture of the tool and either one or both edges of the blade may be serrated, as shown in Fig. 6.

The forwardly directed rip-saw like teeth of the blades when drawn or pushed just under the surface of the ground engage the roots of the vegetation to be destroyed and pull it up thereby most effectively preventing its regrowth. This same rip-saw principle of the teeth combined with extension of narrow blade beyond supports makes it possible to reach in between closely growing plants and destroy undesirable weeds or plants which generally require hand pulling. Thus is evident the excellence of this device for thinning plants or for ridding the lawn of weeds. A further advantage of the rip-saw style of edge combined with good quality steel of blade is that the weeder may be readily sharpened with a file and thus retain its original effectivenes.

Altho I have herein described and shown as a whole only one form of my weeder viz., the short handled one made up of two blades joined in a V, it is to be understood that the variations that I have specified, may be made therein without departing from the spirit of the invention and the spirit and scope of the appended claim.

I am aware that prior to my invention certain weeding tools with serrated parts and angled points have been made, therefore I do not claim said principles nor their combinations broadly, but I claim:

A weed pulling implement of the character described comprising an angled steel element having a vertex and divergences, said element being edged with evenly spaced ripsaw teeth that form the grasping means for holding a weed or plant and virtually ripping it from the ground; said steel element having substantial support consisting of three prongs so designed that the shortest prong, being attached at vertex of angled element, and the other two prongs, of equal length with respect to each other, being firmly and rigidly secured to the respective divergences of the angled element intermediate the vertex and the ends of respective divergences thus leaving ends of divergences free to extend rearwardly of the prong supports; said two prongs extending above and in same general direction as the respective divergences to which they are fastened, and converging to join the short prong above and slightly beyond vertex of element where the three prongs are fitted to a handle.

HERBERT WOODRUFF.